(12) United States Patent
LaMontagne et al.

(10) Patent No.: US 9,870,571 B1
(45) Date of Patent: Jan. 16, 2018

(54) METHODS AND SYSTEMS FOR DETERMINING USER INTERACTION BASED DATA IN A VIRTUAL ENVIRONMENT TRANSMITTED BY THREE DIMENSIONAL ASSETS

(71) Applicant: Trivver, Inc., Huntington Beach, CA (US)

(72) Inventors: Joel LaMontagne, Huntington Beach, CA (US); Simon Keating, Aldershot (GB)

(73) Assignee: Trivver, Inc., Huntington Beach, CA (US)

( * ) Notice: Subject to any disclaimer, the term of this patent is extended or adjusted under 35 U.S.C. 154(b) by 0 days.

(21) Appl. No.: 15/607,132

(22) Filed: May 26, 2017

Related U.S. Application Data (63) Continuation of application No. 15/209,688, filed on Jul. 13, 2016.

(51) Int. Cl.
*G06Q 30/00* (2012.01)
*G06Q 30/02* (2012.01)
(Continued)

(52) U.S. Cl.
CPC ......... *G06Q 30/0251* (2013.01); *A63F 13/30* (2014.09); *G06T 19/20* (2013.01); *A63F 2300/66* (2013.01); *G06T 2219/024* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS 6,828,966 B1 * 12/2004 Gavriliu ................. G06T 17/20
345/420
9,443,352 B1 * 9/2016 Glover .................. G06T 19/003
(Continued)

OTHER PUBLICATIONS

Vire AR/VR tracking [available at http://vire.co/tracking], publication date unknown, earliest date is Oct 26, 2016.

*Primary Examiner* — Yu Chen
(74) *Attorney, Agent, or Firm* — Chhabra Law Firm, PC (57) ABSTRACT

In one embodiment, a plurality of 3D digital assets that can be associated with scripts to transmit user interaction, when displayed within a 3D environment in a client machine. The system includes a 3D digital asset processing system configured to receive user interaction data related to the 3D digital asset from the client machine and generate metrics related to user interaction with the 3D digital asset. In one embodiment, the metrics are generated by determining whether the 3D digital asset, comprising a collidable mesh, is drawn on a culling mask of a camera, and further using ray casting, drawing a line between the camera and the 3D digital asset. When the line collides with the collidable mesh of the 3D digital asset, using a screen bounding function of a 3D engine of the virtual environment, a proportion of the 3D digital asset on a user interface is determined to obtain a percentage of the user interface that is covered by the 3D digital asset. Thereafter, data related to user interaction with the 3D digital asset in the 3D environment is determined using the percentage.

15 Claims, 10 Drawing Sheets

(51) Int. Cl.
 *G06T 19/20* (2011.01)
 *A63F 13/30* (2014.01)

(56) References Cited

U.S. PATENT DOCUMENTS

| | | | |
|---|---|---|---|
| 2002/0033845 A1* | 3/2002 | Elber | G06T 17/00 |
| | | | 715/764 |
| 2006/0287105 A1 | 12/2006 | Willis | |
| 2007/0060345 A1* | 3/2007 | Edwards | A63F 13/10 |
| | | | 463/31 |
| 2007/0060346 A1* | 3/2007 | Edwards | A63F 13/10 |
| | | | 463/31 |
| 2007/0072676 A1 | 3/2007 | Baluja | |
| 2007/0078706 A1 | 4/2007 | Datta et al. | |
| 2009/0138813 A1 | 5/2009 | LaMontagne | |
| 2010/0030640 A1 | 2/2010 | van Datta et al. | |
| 2010/0217666 A1 | 8/2010 | Belenguer | |
| 2013/0158965 A1* | 6/2013 | Beckman | G06F 17/5009 |
| | | | 703/6 |
| 2014/0114742 A1 | 4/2014 | LaMontagne et al. | |
| 2014/0149903 A1* | 5/2014 | Ahn | G06F 3/0488 |
| | | | 715/765 |
| 2015/0035822 A1* | 2/2015 | Arsan | G06T 19/006 |
| | | | 345/419 |
| 2015/0035823 A1* | 2/2015 | Arsan | G06T 15/20 |
| | | | 345/419 |
| 2016/0293133 A1* | 10/2016 | Dutt | G06F 8/20 |
| 2017/0132567 A1* | 5/2017 | Glunz | G06Q 10/101 |
| 2017/0228943 A1* | 8/2017 | Arsan | G06T 19/20 |

\* cited by examiner

METHODS AND SYSTEMS FOR DETERMINING USER INTERACTION BASED DATA IN A VIRTUAL ENVIRONMENT TRANSMITTED BY THREE DIMENSIONAL ASSETS

CROSS REFERENCE TO RELATED APPLICATIONS

The present application is a continuation of, and claims priority from, co-pending U.S. patent application Ser. No. 15/209,688, filed on Jul. 13, 2016, titled "Methods And Systems For Displaying Digital Smart Objects In A Three Dimensional Environment." The contents thereof are incorporated herein by reference for all purposes to the extent that such subject matter is not inconsistent herewith.

FIELD OF THE INVENTION

Embodiments of the present invention relates generally to the field of displaying objects in a three dimensional environment. More particularly, embodiments of the invention relate to implementation of digital smart objects that can be used for advertising purposes in a three dimensional environment.

BACKGROUND OF THE INVENTION

Digital advertising currently requires creating specific and customized content (e.g., images, videos, text, etc.) for each advertiser individually, and placing them directly at various forms of digital platforms (e.g., websites, games, etc.). Furthermore, such advertising often relies on Hypertext Transfer Protocol (HTTP) based cookies. An HTTP cookie, also known as a web cookie or browser cookie, is data sent from a server and stored at a client's machine comprising information related to the user's choices so that only relevant ads are transmitted to the user. Conventionally, once the user visits a website/web-page, a third party cookie is saved locally at the client machine and each time the client revisits the webpage/website the cookie is transmitted back to the third party server. Furthermore, such systems require that the advertiser provide content for the advertisement, however, the advertiser has no control where or how the content would be displayed, except for providing keywords to the advertising system.

However, such advertising systems often result in ineffective advertising due to the inherent limitations of keyword based advertising. Furthermore, fake or mistaken clicks occur regularly, which are further detrimental to the advertiser's interest. Such systems have no means of determining, in advance, if its advertising at a publisher's digital platform would generate in meaningful results. Thus, conventional advertising platforms often result in wasteful and inefficient advertising.

Therefore, efficient systems, methods, and techniques are needed that allow a developer, publisher, or advertiser to overcome these limitations without the use of cookies. Such systems should further permit the developer or publisher to provide information that can help an advertiser determine the intended audience of the publisher's content.

SUMMARY OF THE DESCRIPTION

Using various embodiments, methods and systems are disclosed to display three dimensional (3D) digital assets, referred to as smart objects or digital smart objects herein, in various 3D environments (e.g., games, Virtual Reality environments, Augmented Reality environments, Smartphone Applications ("Apps"), Digital TV (OTT), Web Interfaces, Game Consoles, Video, etc.), and can be associated with advertisements that are to be analyzed. Although certain embodiments are discussed within a gaming environment, a person having ordinary skill in the art would appreciate that the techniques described herein can be implemented in any 3D environment. Furthermore, a game, as referred herein this document, can be any 3D interactive environment. Similarly, a game engine, as referred herein, can be any rendering engine suitable for its respective 3D environment; game development environment, as referred herein, can be any 3D development environment, as known to a person having ordinary skill in the art.

In one embodiment, a system implementing the techniques described herein can receive a request to present the 3D digital smart object in a game development environment of a game engine. In one embodiment, the 3D digital smart object can be enclosed in a 3D placeholder. In one embodiment, the 3D placeholder can be a transparent cube. The system can further be configured to retrieve 3D digital smart object data from an asset repository. The 3D digital smart object data can be associated with an asset category and asset type. In one embodiment, the 3D digital smart object data can include an asset, asset anchor location, and standard asset size information of the asset in a 3D space. In another embodiment, the 3D digital smart object data can further include a minimum and/or maximum polygon count value of the asset. In one embodiment, the asset can be a generic representation of an object or shape. In another embodiment, the asset can be a branded representation of an object or shape. In yet another embodiment, the asset can be replaced with a branded representation of another object or shape.

In one embodiment, the standard asset size information provides the maximum 3D size of the asset relative to the 3D placeholder. The standard asset size information can also include an X-axis, Y-axis, and Z-axis dimension of the asset. In one embodiment, the standard asset size information can be determined when at least one of the X-axis, Y-axis, or Z-axis dimension of the asset equals to its corresponding axis dimension of the 3D placeholder.

The system can further be configured to transmit the 3D digital smart object data to the game development environment of the game engine, and receive a position location for the 3D digital smart object in the online game. In one embodiment, the position location includes an X-axis, Y-axis, and Z-axis coordinates of a location within a scene of the game where the 3D digital smart object is intended to be placed. The system can also receive scaling information related to the 3D digital smart object. In one embodiment, the scaling information provides a factor for each coordinate of the 3D digital smart object. The factor determines the relative size of the 3D digital smart object in a game scene of the game. The system can then store, into an asset repository, the position location, and scaling information related to the 3D digital smart object displayed in the game. The 3D digital smart object can be displayed at the position location when a player is interacting with the game at the game scene.

In yet another embodiment, the 3D digital smart object can be placed within a game and associated with advertisements that are to be analyzed. In this embodiment, the 3D digital smart object can record different types of interaction of the 3D digital smart object with a user of the game and transmit user interaction information to the system.

Further, in another embodiment, the 3D digital smart object can be placed within any 3D environment (e.g., 3D virtual environment for commercial and/or residential Real estate). A person having ordinary skill in the art would appreciate that in this embodiment, the 3D digital smart objects can transmit user interaction/viewability information based on a user's browsing the virtual environment. In another embodiment, the user can interact with a 3D digital smart object from within (that is, from inside the smart object). For example, in a real estate 3D environment (where the game is an interactive environment displaying a 3D view of at least one property), different rooms throughout the real estate property can be a smart object whereas the system records and transmits the overall time spent a user had in each room.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

Figure 1:
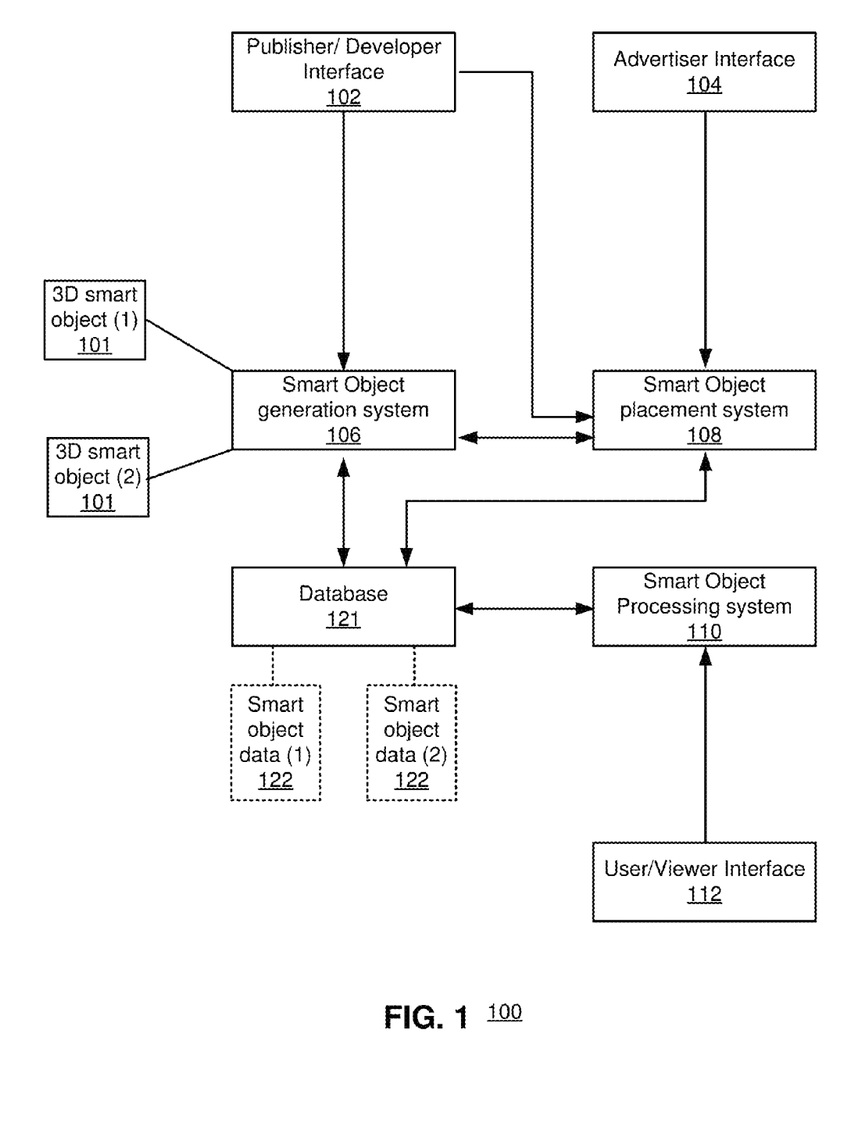
FIG. 1 illustrates a block diagram of a general system architecture that can generate and implement 3D digital smart objects to process advertising related relevant information, according to one embodiment of the present invention.

FIG. 1 illustrates a block diagram of a general system architecture that can generate and implement 3D digital smart objects to process advertising related relevant information, according to one embodiment of the present invention. 3D digital smart objects, in one embodiment, can be used to generate generic content (banner/billboard, videos, and/or 3D assets) that can optionally be replaced with branded content from an advertiser within a variety of digital platforms and measure the user performance with both the generic and branded content across the digital platform. In one embodiment, a 3D digital smart object comprises an asset encompassed in a transparent 3D asset placeholder that dictates the maximum X-Axis, Y-Axis, and Z-Axis dimensions of an asset/object and/or and understands the scaling dimensions that takes up a specific shape in a 3D digital environment. The asset within the 3D asset placeholder provides a visual representation of the 3D digital smart object. The asset can be, in one embodiment, a 3D representation of geometric data, where the asset within the 3D asset placeholder provides a visual representation of the 3D digital smart object. A 3D digital smart object comprises an asset that can be any media content such as, 3D non-active assets, assets, video, audio, multi-media object, any general 3D representation of geometric data, or a combination thereof. In various embodiments, 3D digital smart objects can be used for services related to advertising, notification, or generally for any service that can personalize a viewer's environment with 3D content that is relevant to each viewer.

After 3D digital smart object 101 has been generated, it can be placed into a three dimensional environment by 3D digital smart object placement system 108. Various exemplary embodiments of implementing 3D digital smart object 101 in a 3D environment, are disclosed in U.S. patent application Ser. No. 15/209,679, filed concurrently with the parent application, U.S. patent application Ser. No. 15/209,688, on Jul. 13, 2016, can be employed, in whole or in part, with the present invention. As a result, the above-identified disclosures are incorporated herein by reference in their entirety.

As illustrated, publisher or developer can, using publisher interface 102, request the 3D digital smart object placement system 108 to place 3D digital smart object 101 in a three dimensional environment, as described further herein. 3D digital smart object placement system 108 can request the publisher's input to select a 3D digital smart object (generated by 3D digital smart object generation system 106) and save the coordinates, including game identification data, smart object identification data, smart object category/type data, publisher/developer identification data, and location/scene identification data. 3D digital smart object placement system 108 can interact with the developer using various 3D game development environments. Generally, a 3D environment intending to implement the techniques described herein would need to provide SDK(s), API(s), or any other means using which 3D digital smart object placement system 108 can interact with the 3D environment's development interface. Thus, in one embodiment, publisher interface 102 can be a game development environment (e.g., Unity® engine, Unreal® engine, Torque 3D® engine, Adobe® Air, etc.). In another embodiment, publisher interface 102 can be any 3D development environment, as known to a person having ordinary skill in the art. However, it should be noted, the invention described herein is not intended to be limited to any particular 3D development environment. Therefore, 3D digital smart object 101 has been generated by 3D digital smart object generation system 106, the publisher can request the 3D digital smart object 101 be placed in an 3D environment by requesting the 3D digital smart object placement system 108, using a SDK or API set provided to the developer by the 3D environment.

In another embodiment, a system administrator of the 3D digital smart object placement system 108 can present predetermined 3D digital smart objects (to the developer) that can be placed within a three dimensional environment using 3D digital smart object placement system 108. Generally, 3D digital smart object placement system 108 can be any computing engine that can interact with a 3D environment and determine the location (within the environment) where the 3D digital smart object has been placed by the developer/publisher, and save it as placement data. 3D digital smart object placement system 108 can further associate the placement data of 3D digital smart object 101 in a 3D environment with 3D environment identification data that identifies the digital platform using 3D digital smart object 101. In one embodiment, the publisher or developer can place 3D digital smart object 101 as a GSO. In another embodiment, the publisher or developer can place 3D digital smart object 101 as a BSO. When the developer/publisher places a GSO in the 3D environment, an advertiser, in one embodiment, using advertiser interface 104 can interact with 3D digital smart object placement system 108 to replace the publisher provided asset with a branded asset to generate a BSO. In yet another embodiment, the developer/publisher can provide the system with a branded asset (instead of a generic asset) to generate a BSO, which is then placed by the developer using 3D digital smart object placement system 108.

After the placement of 3D digital smart object 101 into the 3D environment, user interaction or viewability based metrics generated from 3D digital smart object 101 can be generated via 3D digital smart object processing system 110. In one embodiment, 3D digital smart object processing system 110 can be any system that is capable of analyzing information received from 3D digital smart object 101 and generate metrics related to any user interaction, including tapping, touching, moving, time spent with the smart object, viewing (e.g., from a distance), requesting detailed description, etc., of smart object 101, via user interface 112. The generated metrics can be useful to advertiser and/or publisher associated with the 3D environment.

Figure 2:
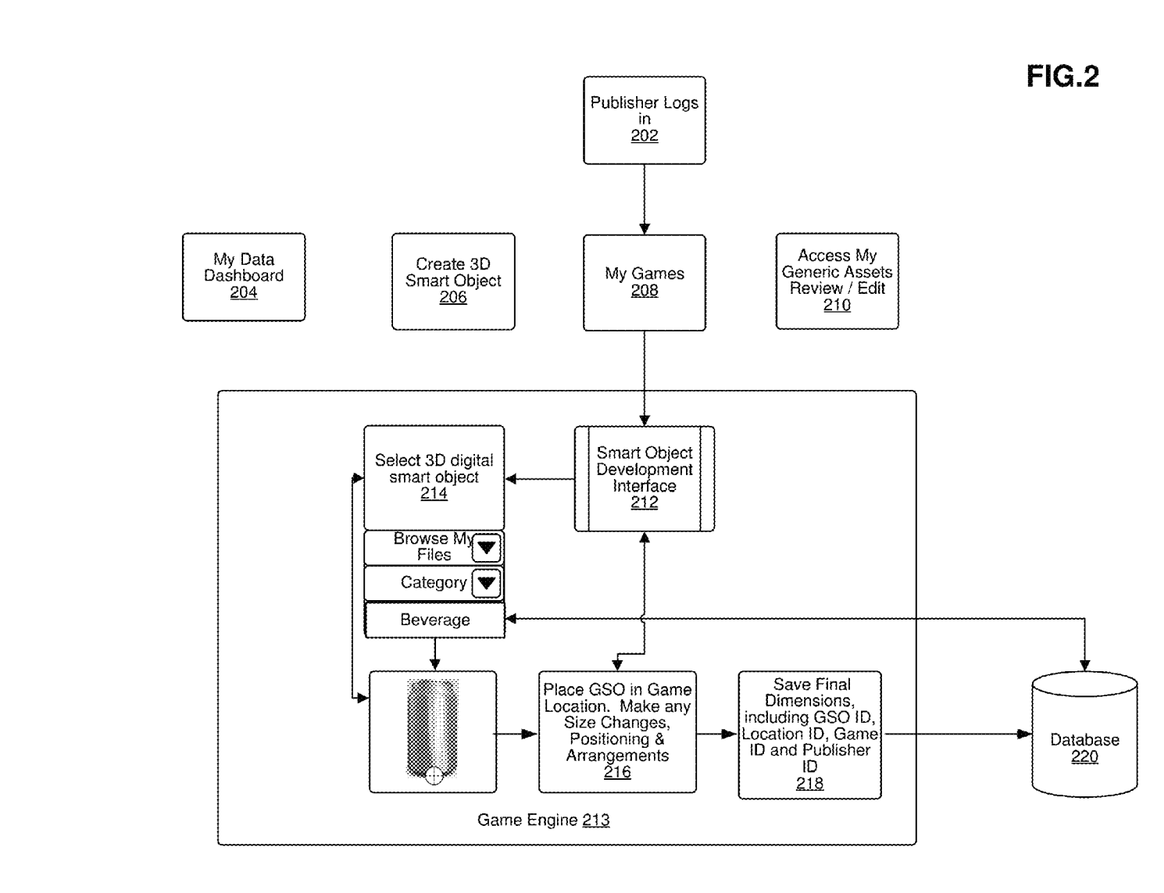
FIG. 2 illustrates displaying a 3D digital smart object in a three dimensional environment by a publisher, according to one embodiment of the present invention.

FIG. 2 illustrates displaying a 3D digital smart object in a three dimensional environment by a publisher, according to one embodiment of the present invention. As illustrated, at 202 a publisher or game developer logs in to the gaming environment, via publisher interface 102, the 3D digital smart object implementation system can be accessed in a 3D digital smart object developer menu via an API or SDK installed within the gaming environment. Thereafter, the publisher/game developer, in one embodiment, can select options like viewing their data dashboard 204, where performances of their 3D digital smart objects can be viewed and reported, create 3D digital smart object 206, access games they are developing (or contributing towards), or access 3D digital smart objects 101 generated by the developer or publisher. 3D digital smart objects created by the developer can be generic 3D digital smart objects (GSOs) or branded 3D digital smart objects (BSOs). Generic 3D digital smart objects are 3D digital smart objects in which the asset is a generic representation of an object, location or shape. Branded 3D digital smart objects are 3D digital smart objects in which the asset is a branded representation of an object or shape.

To implement a 3D digital smart object in a game, the developer can select a game under development, and via the game engine 213, access 3D digital smart object development interface 212. 3D digital smart object placement system 108 presents the developer an option to select a 3D digital smart object to be placed within the game, as illustrated at 214. In one embodiment, the publisher/developer is prompted to select an asset category and/or type to narrow (or filter) the 3D digital smart objects visible to the developer/publisher. Generally, a publisher/developer can only select system provided 3D digital smart objects and/or 3D digital smart objects created by the developer/publisher (or their team). However, in another embodiment, a developer can opt to share their 3D digital smart objects within a group or make them publically accessible. After the publisher/developer selects a 3D digital smart object 3D digital smart object placement system 108, displays the selected 3D digital smart object asset in a 3D placeholder. In one embodiment, the 3D placeholder can be a cube. The 3D digital smart object placement system 108 also retrieves and transmits 3D digital smart object data associated with the displayed asset from an asset repository, associated with the asset category and/or asset type, the 3D digital smart object data including an asset, asset position anchor location, and standard asset size information of the asset in the 3D placeholder. The asset position anchor location determines the location of the asset relative to the 3D asset placeholder, while the asset orientation determines the orientation of the asset itself (e.g., vertical, horizontal, etc.); the asset position anchor location in one embodiment can be at least the X-axis, Y-axis, or Z-axis of the 3D asset placeholder. The asset position anchor location is the axis of the 3D asset placeholder that acts as a base axis for the asset (in other words, the asset's orientation is relative to the selected axis). The anchor location can be provided by the creator of the 3D digital smart object. The standard asset size information, in one embodiment, provides the maximum 3D size of the asset relative to the 3D placeholder, and includes an X-axis, Y-axis, and Z-axis dimension of the asset. The standard asset size information can be determined when at least one of the X-axis, Y-axis, or Z-axis dimension of the asset equals to its corresponding axis dimension of the 3D placeholder.

The publisher/developer can then place the 3D digital smart object at their desired location in the game scene (that is, the visible area of a scene in a game), and scale the 3D digital smart object relative to the game scene, as needed, as illustrated at 216. In one embodiment, the developer can use the same 3D digital smart object and provide different scaling and positioning information, as further illustrated in FIG. 5. At 218, 3D digital smart object placement system 108 can then save the placement information in database 220, including, size (scale) changes, positioning, and other arrangements to the database. 3D digital smart object placement system 108 can further associate the data with the game identification information, location (position within the game) identification information, 3D digital smart object identification data, and publisher identification information. The position location, in one embodiment, includes an X-axis, Y-axis, and Z-axis coordinates of a location within a scene of the online game where the 3D digital smart object is intended to be placed/ viewed by a player of the game. In one embodiment, the developer/publisher can override the asset position anchor location while placing the 3D digital smart object in a game. In this embodiment, the developer can transmit their preferred anchor location to 3D digital smart object placement system 108, which is associated with the game, position, and developer identification data and saved in database 220. In one embodiment, the scaling information provides a factor for each coordinate of the 3D digital smart object; the factor determines the relative size of the 3D digital smart object in a game scene.

Figure 3:
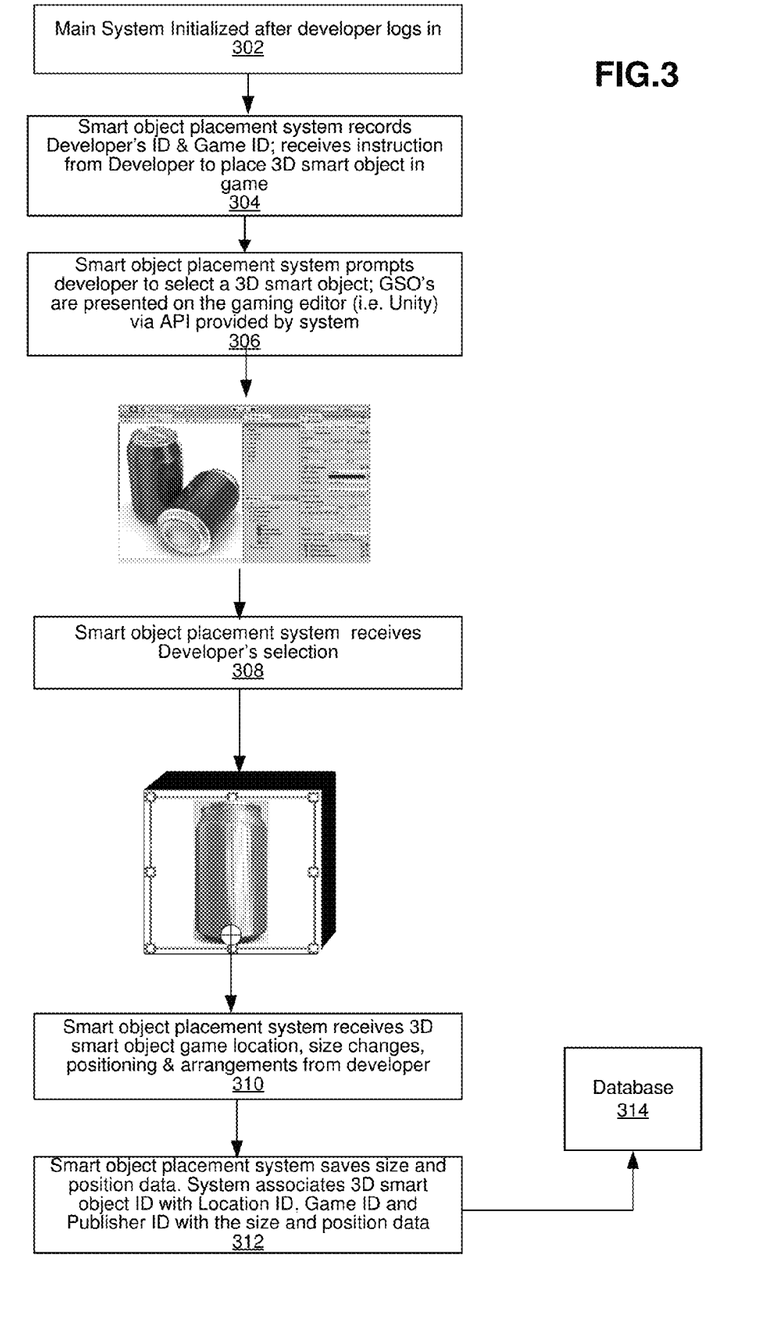
FIG. 3 illustrates describing the operations of a system implementing a 3D digital smart object in a three dimensional environment, according to one embodiment of the present invention.

FIG. 3 illustrates describing the operations of a system implementing a 3D digital smart object in a three dimensional environment, according to one embodiment of the present invention. As illustrated, at 302, system 100 is initialized after the developer logs into the 3D game development environment. At 304, system records the developer's identification data and game identification data. When the developer provides an instruction to place a 3D digital smart object within the gaming environment, at 306, the 3D digital smart object placement system 108 prompts the developer to select a 3D digital smart object. The developer can then select a GSO or BSO, as illustrated above. In one embodiment, 3D digital smart objects are presented to the developer via the gaming developer interface/editor (e.g., Unity) via API provided by system. At 308, system 108 receives developer's selection. At 310, 3D digital smart object placement system 108 receives 3D digital smart object game location, size changes, positioning & arrangements from the developer. At 312, 3D digital smart object placement system 108 saves size and position data, along with 3D digital smart object identification data, location identification data, game identification data, and publisher identification data in database 314. In one embodiment, in case the developer has positioned a GSO, an advertiser can use this data to target a GSO for asset replacement to convert the GSO into a BSO.

Figure 4:
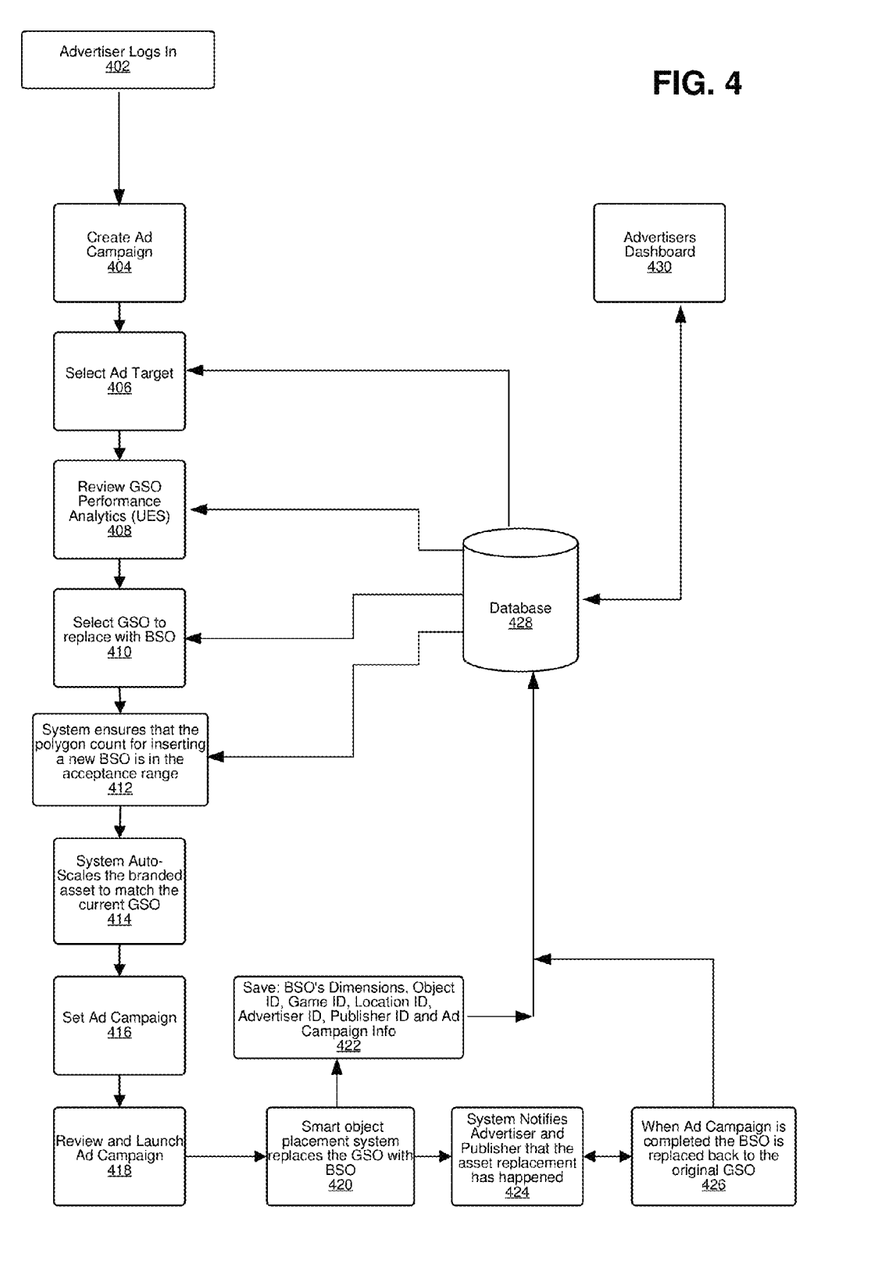
FIG. 4 illustrates the operations of an advertiser replacing a generic asset of a 3D digital smart object with a branded asset, according to one embodiment of the present invention.

FIG. 4 illustrates the operations of an advertiser replacing a generic asset of a 3D digital smart object with a branded asset, according to one embodiment of the present invention. In one embodiment, 3D digital smart object 101 can be placed within a three dimensional environment and associated with advertisements that are to be analyzed, and wherein the 3D digital smart object can record different types of interaction of the 3D digital smart object with a user of the game and transmit user interaction information to the computing device. Advertisements can be placed by replacing a generic asset of a 3D digital smart object with a branded asset to convert a GSO to a BSO, in one embodiment, the advertiser logs in to system 100, as illustrated at 402. Thereafter, at 404, the advertiser creates at advertisement campaign. At 406, an advertisement target audience is selected by the advertiser. Based on the advertisement targeted audience, the developer presented an option to select an asset category and/or type related to which GSOs are displayed. After the advertiser selects an asset category and/or type, a list of GSOs are displayed to the advertiser. At 408, the advertiser can review each GSO's past performance analytics, and select a GSO asset to be replaced by a branded asset to convert a GSO to a BSO, as illustrated at 410. After the advertiser selects a GSO for replacement of the asset, the advertiser uploads the branded asset (e.g., Coca-Cola® soda can) to replace the GSO asset (e.g., generic soda can). After the branded asset has been uploaded, 3D digital smart object placement system 108 can, in one embodiment, ensure that the uploaded branded asset is within the parameters set by the creator of the GSO as illustrated at 412. Parameters set by the creator of the GSO can be the 3D digital smart object data provided during the generation of the 3D digital smart object, including, the standard asset information, asset anchor location position, and/or a minimum/maximum polygon count value for the branded asset that can replace the GSO asset to generate a BSO. In one embodiment, defining a minimum and/or maximum polygon count value assists in generating an advertisement standard that can allow of a BSO to be generated programmatically by replacing a GSO asset with a branded asset. In another embodiment, the publisher can further identify the types of different branded objects that can replace the asset by identifying the asset category and/or asset type. In one embodiment, the 3D digital smart object data can further associated with publisher identification data associated with the developer. In another embodiment, the 3D digital smart object data can also be associated with advertiser identification data associated with an advertiser.

In one embodiment, based on the standard asset size information provided by the 3D digital smart object creator, the system can automatically scale the branded asset (of a BSO) to match the asset size of the GSO, as illustrated at 414. At 416, the advertiser can set the advertisement campaign and at 418, the advertiser can review and launch the advertisement campaign. At 420, 3D digital smart object placement system replaces the generic asset with the branded asset to convert the GSO into a BSO. At 422, the BSO's Dimensions, Object ID, Game ID, Location ID, Advertiser ID, Publisher ID and Ad Campaign Information are stored in database 428. In one embodiment, at 424, system 100 can notify the advertiser and/or publisher that the asset replacement has occurred. At 426, in one embodiment, when advertisement campaign is completed the BSO is replaced back to the original GSO in the online game.

Figure 5:
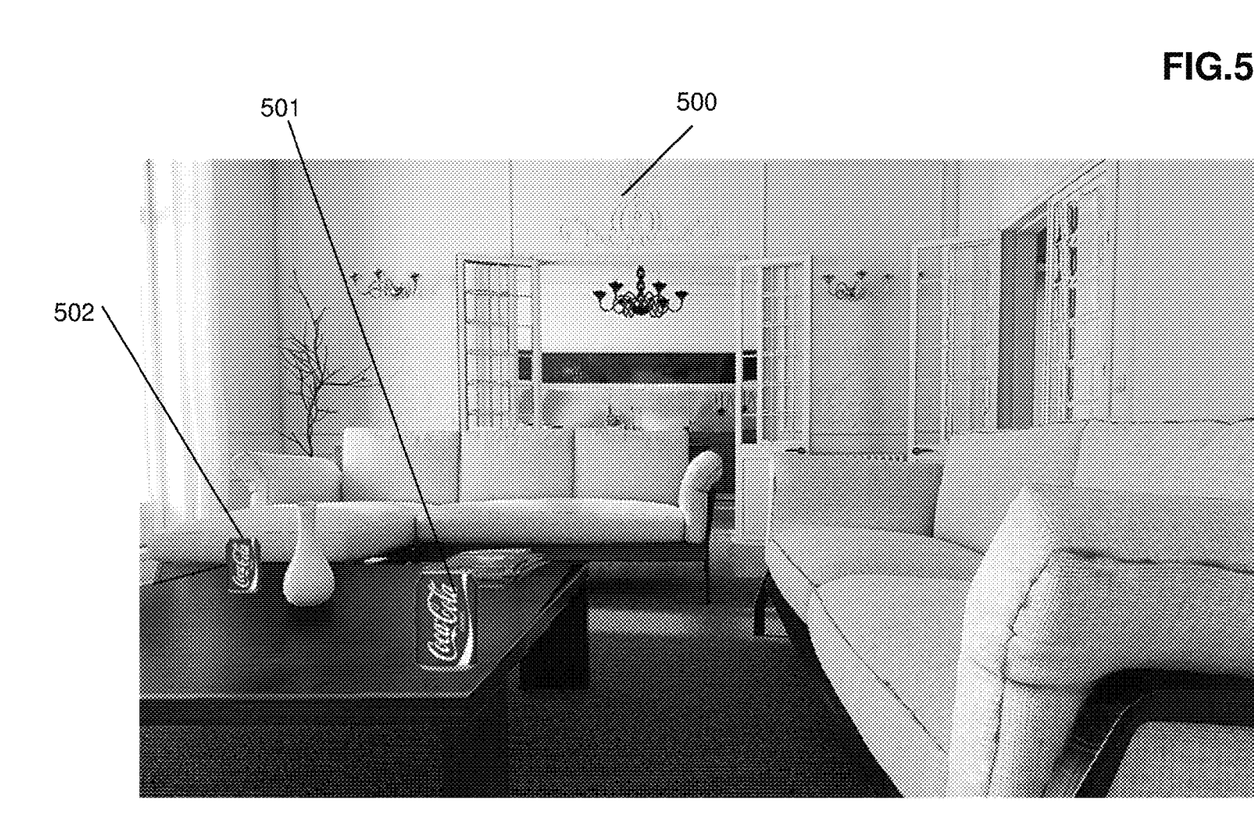
FIG. 5 illustrates the implementation of a branded 3D digital smart object in a three dimensional environment, according to one embodiment of the present invention.

FIG. 5 illustrates the implementation of a branded 3D digital smart object in a three dimensional environment, according to one embodiment of the present invention. As illustrated, game scene 500 can include two BSOs, as depicted at Coca-Cola® beverage cans. In one embodiment, the BSOs can either be placed in the game directly by the publisher/developer. In another embodiment, the developer places GSOs and an advertiser replaces the generic asset with branded assets to convert a GSO into a BSO, as illustrated. Since each 3D digital smart object in the system can be represented by a unique 3D digital smart object identification data, the same GSO can be placed at multiple locations within any number of online games. For example, as illustrated 3D digital smart object 501 and 3D digital smart object 502 can be implemented from one single 3D digital smart object created by a developer or provided by the system. Therefore, the parameters set by the creator of the 3D digital smart object (e.g., the standard asset information, asset anchor location position, and/or a minimum/maximum polygon count value, etc.) for both 3D digital smart object 501 and 3D digital smart object 502 can be same. However, during placement of the 3D digital smart objects, the developer can provide different scaling factors for each 3D digital smart object relative to the game scene, and the corresponding information can be saved by 3D digital smart object placement system for each location.

Since each 3D digital smart object 501 and 3D digital smart object 502 implementation is different (but only shares parameters set by the developer), each 3D digital smart object 501 and 502 can transmit different user engagement metrics to system 100. Therefore, as illustrated, two 3D digital smart objects can be implemented using the same 3D digital smart object and share common parameters as defined/set by the creator of the 3D digital smart object.

Figure 6:
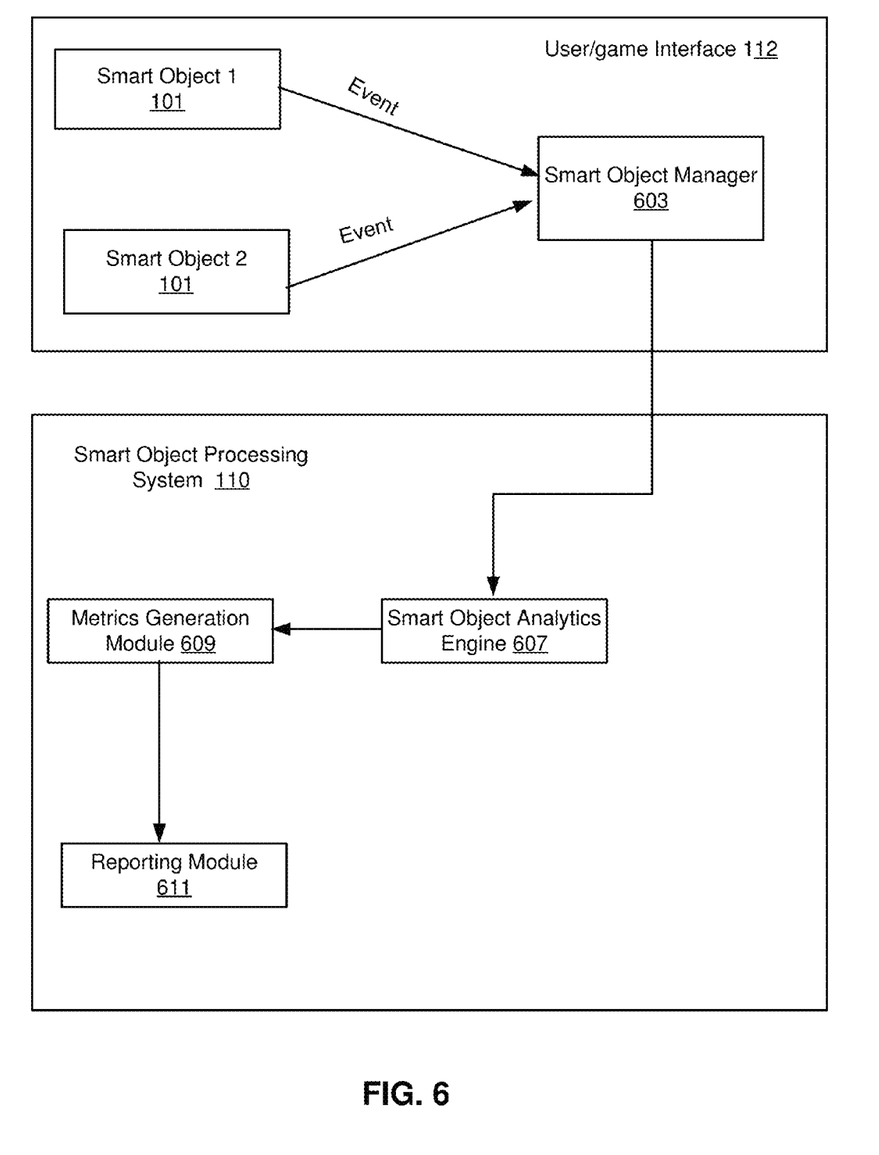
FIG. 6 illustrates a block diagram describing a 3D digital smart object processing system receiving data from a three dimensional environment, according to one embodiment of the present invention.

FIG. 6 illustrates a block diagram describing a 3D digital smart object processing system receiving data from a three dimensional environment, according to one embodiment of the present invention. In one embodiment, when a user/player is on a game scene via interface 112, the player can see 3D digital smart objects 101. The player can interact with the 3D digital smart objects, can choose to view them, or a combination thereof. Each 3D digital smart object 101 can be configured to record different types of interaction of 3D digital smart object 101 with a user/player of the game and transmit user interaction (or viewability) information to 3D digital smart object manager 603, by employing event triggers. 3D digital smart object manager 603 can then forward the information to 3D digital smart object processing system 110. In one embodiment, event triggers are capable of determining user interaction with, or viewability of, a 3D digital smart object and transmit metrics, based on the user interaction (or viewability), to a 3D digital smart object processing system. In one embodiment, the event triggers transmit user interaction including (but not limited to) determining a user viewing a 3D digital smart object, the user interacting with a 3D digital smart object, a distance between the user and a 3D digital smart object, a percentage size of a 3D digital smart object in relationship to the size of the user interface, a period of time that the user interacted with a 3D digital smart object, the percentage of the 3D digital smart object that was viewable on the user's screen (e.g., is the viewable surface of 3D digital smart object 50% below the screen), etc. In one embodiment, event triggers can be configured or customized by the implementer (developer/publisher) of the 3D digital smart object.

In one embodiment, 3D digital smart object manager 603, can be the communication interface between 3D digital smart objects 101 and 3D digital smart object processing system 110. In one embodiment, 3D digital smart object manager 603 resides in the game environment. 3D digital smart objects 101 and 3D digital smart object manager 603 can be compiled within the gaming environment, thus become part of the game. 3D digital smart object manager receives all event triggers from various 3D digital smart objects within a game, and can periodically transmit the user engagement data to 3D digital smart object processing system 110 of system 100 (residing remotely from the gaming server, in one embodiment). 3D digital smart object processing system 110 can include a 3D digital smart object analytics engine 607 that can analyze the data received from each 3D digital smart object 101. Based on the received data, 3D digital smart object analytics engine 607 can transmit the data to a metrics generation module 609 which keeps track of the viewability/interaction of different users with the 3D digital smart object, collectively referred to as performance of the 3D digital smart object herein. This information can then be transmitted to a reporting module 611 that can display the performance at the publisher's and/or advertiser's dashboard.

Figure 7:
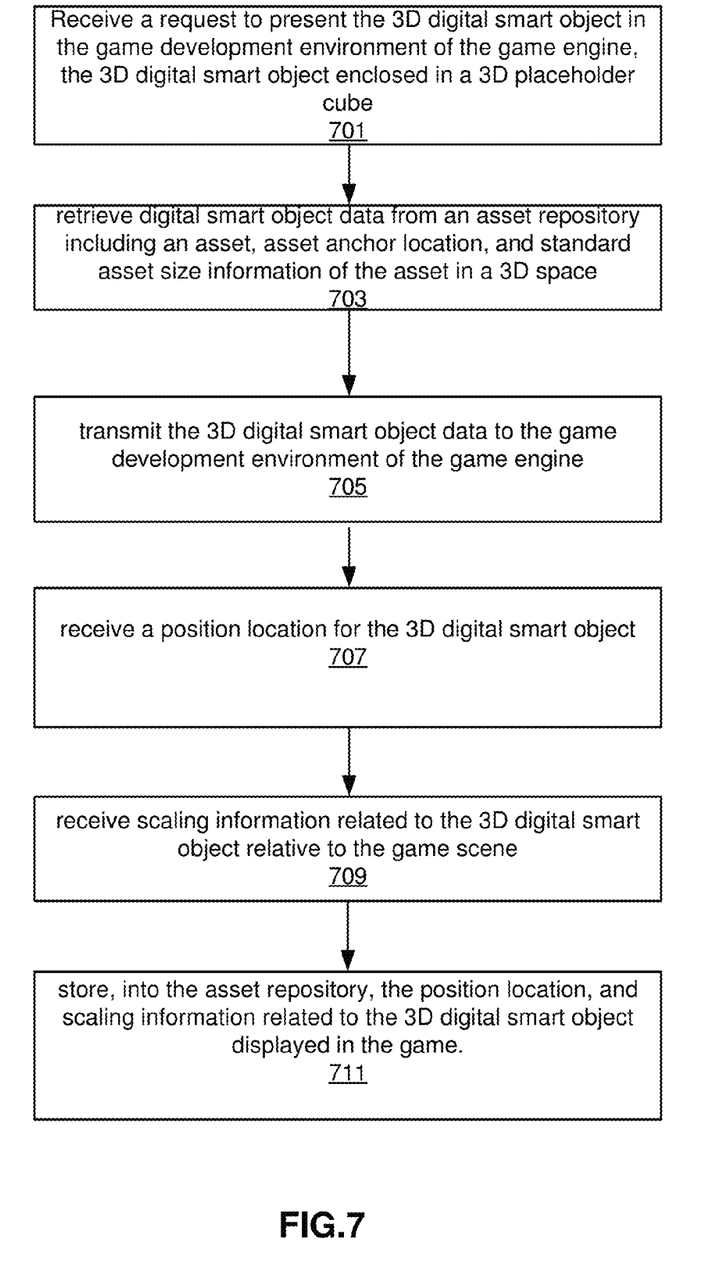
FIG. 7 illustrates the operations of displaying a 3D digital smart object in a game development environment.

FIG. 7 illustrates the operations of displaying a 3D digital smart object in a game development environment. As illustrated, at 701, 3D digital smart object placement system 108 receives a request to present the 3D digital smart object in the game development environment of the game engine, the 3D digital smart object enclosed in a 3D placeholder cube. At 703, system 108 retrieves 3D digital smart object data from an asset repository including an asset, asset anchor location, and standard asset size information of the asset in a 3D space. At 705, system 108 transmits the 3D digital smart object data to the game development environment of the game engine, and at 707 system 108 receives a position location for the 3D digital smart object. At 709, system 108 receives scaling information related to the 3D digital smart object relative to the game scene. At 711, system 108 stores into the asset repository the position location, and scaling information related to the 3D digital smart object displayed in the game.

Figure 8:
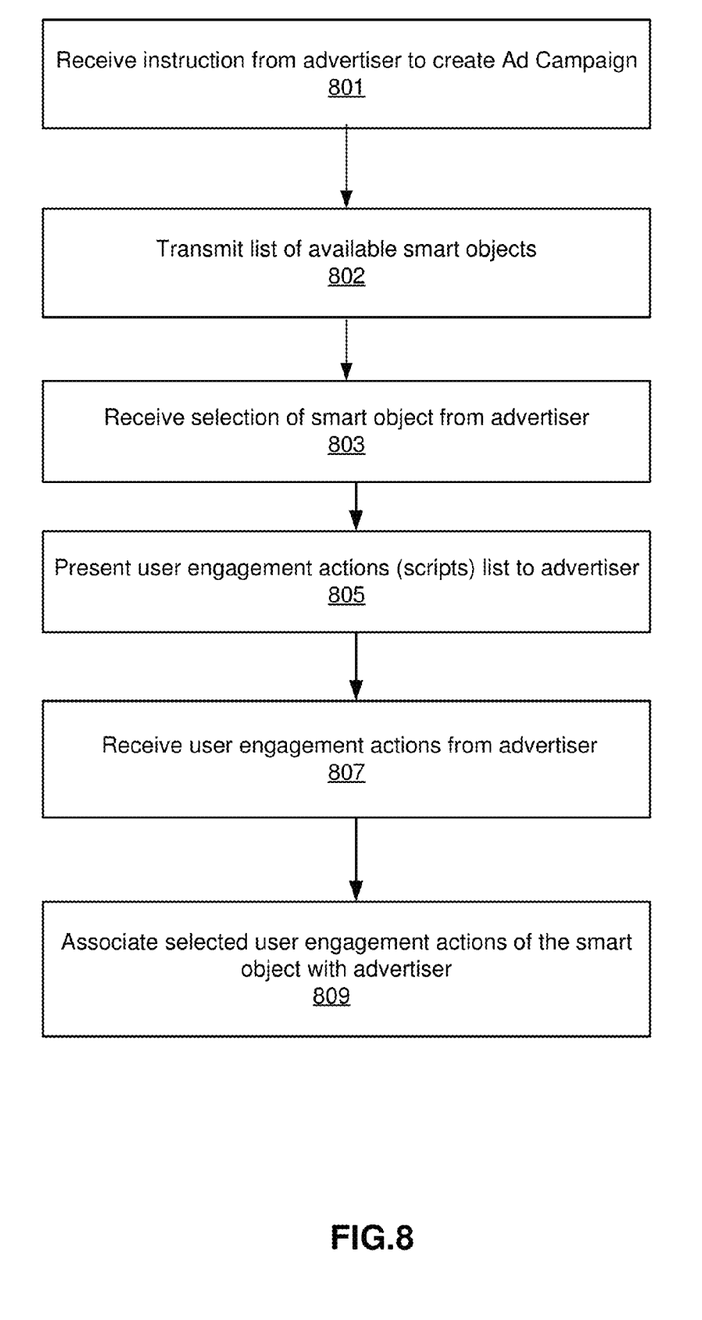
FIG. 8 illustrates the operations of receiving user engagement actions related to a 3D digital smart object by a 3D digital smart object placement system, according to one embodiment of the present invention.

FIG. 8 illustrates the operations of receiving user engagement actions and viewability metrics related to a 3D digital smart object by a 3D digital smart object placement system, according to one embodiment of the present invention. At 801, 3D digital smart object placement system 108 can receive an instruction from an advertiser to create Ad Campaign. At 802, the system transmits a list 3D digital smart objects that are available to the advertiser. At 803, the system can receive a selection of 3D digital smart object from advertiser. At 805, the system present user engagement actions and viewability metrics (scripts) list to advertiser, and at 807, the system receives user engagement actions and viewability metrics from advertiser. At 809, system 108 associates selected user engagement actions of the 3D digital smart object with advertiser.

Figure 9:
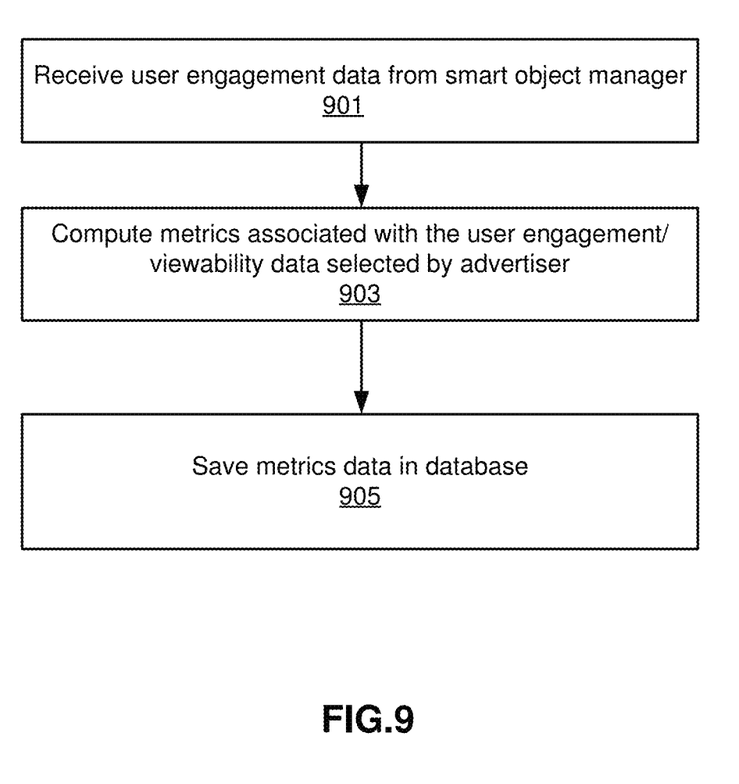
FIG. 9 illustrates the operations of receiving user engagement data by a 3D digital smart object processing system, according to one embodiment of the present invention.

FIG. 9 illustrates the operations of receiving user engagement data by a 3D digital smart object processing system, according to one embodiment of the present invention. Once the 3D digital smart objects are viewed, or interacted with, by a user/player of the game, at 901, 3D digital smart object processing system 110 can receive user engagement data and viewability metrics from 3D digital smart object manager. At 903 system 110 can compute metrics associated with the user engagement data selected by advertiser and at 905 system 110 can save metrics data in database.

The techniques shown in the figures can be implemented using computer program instructions (computer code) and data stored and executed on one or more electronic systems (e.g., computer systems, etc.). Such electronic systems store and communicate (internally and/or with other electronic systems over a network) code and data using machine-readable media, such as machine-readable non-transitory storage media (e.g., magnetic disks; optical disks; random access memory; dynamic random access memory; read only memory; flash memory devices; phase-change memory). In addition, such electronic systems typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

It should be apparent from this description that aspects of the present invention may be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

Figure 10:
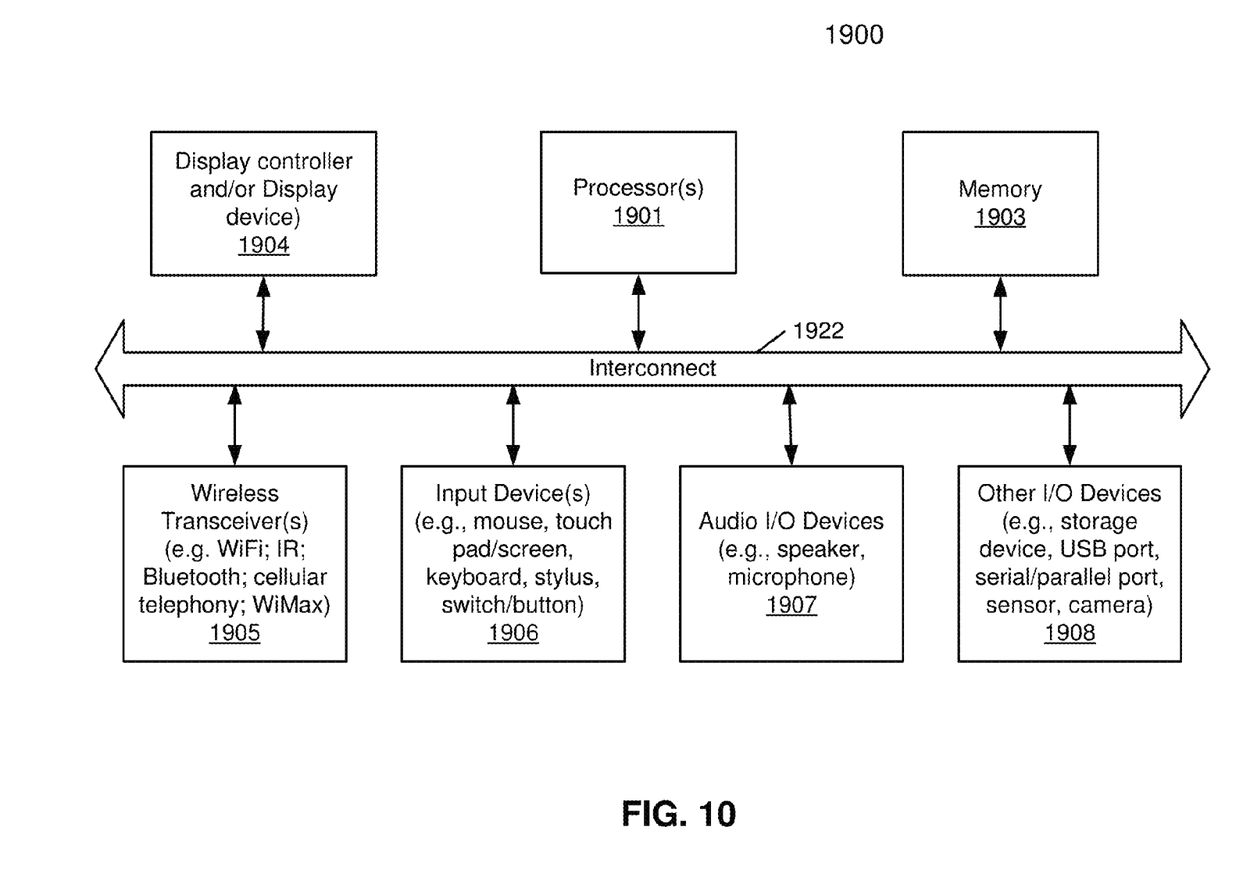
FIG. 10 is a block diagram illustrating a data processing system such as a computing system 1900 which may be used with one embodiment of the invention.

FIG. 10 is a block diagram illustrating a data processing system such as a computing system 1900 which may be used with one embodiment of the invention. For example, system 1900 may be implemented as part of system displaying 3D digital smart objects in a three dimensional environment. In one embodiment, system 1900 may represent system 100. System 1900 may have a distributed architecture having dispersed units coupled through a network, or all of its components may be integrated into a single unit. Computing system 1900 may be implemented as part of a diverse range of products implemented by Trivver, Inc.

For example, computing system 1900 may represents any of data processing systems described above performing any of the processes or methods described above. System 1900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1900 is intended to show a high level view of many components of the computer system. However, it is to be understood that additional or fewer components may be present in certain implementations and furthermore, different arrangement of the components shown may occur in other implementations. System 1900 may represent a desktop, a laptop, a tablet, a server, a mobile phone, an OTT device, a programmable logic controller, a personal digital assistant (PDA), a personal communicator, a network router or hub, a wireless access point (AP) or repeater, a set-top box, or a combination thereof.

In one embodiment, system 1900 includes processor 1901, memory 1903, and devices 1905-1908 via a bus or an interconnect 1922. Processor 1901 may represent a single processor or multiple processors with a single processor core or multiple processor cores included therein. Processor 1901 may represent one or more general-purpose processors such as a microprocessor, a central processing unit (CPU), or the like. More particularly, processor 1901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1901, which may be a low power multi-core processor socket such as an ultra-low voltage processor, may act as a main processing unit and central hub for communication with the various components of the system. Such processor can be implemented as a system on chip (SoC). In one embodiment, processor 1901 may be an Intel® Architecture Core™-based processor such as an i3, i5, i19 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments.

Processor 1901 is configured to execute instructions for performing the operations and methods discussed herein. System 1900 further includes a graphics interface that communicates with graphics subsystem 1904, which may include a display controller and/or a display device.

Processor 1901 may communicate with memory 1903, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 207-2E (published April 2007), or a next generation LPDDR standard to be referred to as LPDDR3 that will offer extensions to LPDDR2 to increase bandwidth. As examples, 2/4/8 gigabytes (GB) of system memory may be present and can be coupled to processor 1901 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 1903 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 1903 may store information including sequences of executable program instructions that are executed by processor 1901, or any other device. For example, executable code and/or data of a variety of operating systems, device drivers, firmware (e.g., input output basic system or BIOS), and/or applications can be loaded in memory 1903 and executed by processor 1901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1900 may further include IO devices such as devices 1905-1908, including wireless transceiver(s) 1905, input device(s) 1906, audio IO device(s) 19019, and other IO devices 1908. Wireless transceiver 1905 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof.

Input device(s) 1906 may include a mouse, a touch pad, a touch sensitive screen (which may be integrated with display device 1904), a pointer device such as a stylus, and/or a keyboard (e.g., physical keyboard or a virtual keyboard displayed as part of a touch sensitive screen). For example, input device 1906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO device 1907 may include a speaker and/or a microphone to facilitate voice-enabled functions, such as voice recognition, voice replication, digital recording, and/or telephony functions. Other optional devices 1908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 1908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1907 via a sensor hub (not shown), while other devices such as a keyboard or thermal sensor may be controlled by an embedded controller (not shown), dependent upon the specific configuration or design of system 1900.

To provide for persistent storage of information such as data, applications, one or more operating systems and so forth, a mass storage (not shown) may also couple to processor 1901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 1901, e.g., via a serial peripheral interface (SPI). This flash device may provide for non-volatile storage of system software, including a basic input/output software (BIOS) as well as other firmware of the system.

Note that while system 1900 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Thus, methods, apparatuses, and computer readable medium to display 3D digital smart objects in a three dimensional environment. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A system to determine and record user interaction in a virtual three dimensional (3D) environment, comprising:
   an asset repository comprising a plurality of 3D digital assets, wherein each of the plurality of 3D digital assets can be displayed within the virtual 3D environment;
   a 3D digital asset processing system, coupled to the asset repository, configured to:
   receive data related to user interaction with a 3D digital asset out of the plurality of 3D digital assets in the virtual 3D environment, and
   generate metrics related to user interaction, including tapping, touching, moving, time spent, viewing, requesting detailed description related to the 3D digital asset in the virtual 3D environment; and
   a client computer, coupled to the 3D digital asset processing system, configured to:
   display the 3D digital asset in the virtual 3D environment via a graphical user interface,
   determine whether the 3D digital asset is drawn on a culling mask of a camera in the virtual 3D environment, wherein the 3D digital asset comprises a collidable mesh,
   using ray casting, draw a line between the camera and the 3D digital asset,
   determine that the line collides with the collidable mesh of the 3D digital asset,
   using a screen bounding function of a 3D engine, determine a proportion of the 3D digital asset covering the graphical user interface when it is determined that the line collides with the collidable mesh,
   based on the proportion, obtain a percentage of the graphical user interface that is covered by the 3D digital asset, and
   based on the percentage, generate the data related to user interaction with the 3D digital asset in the virtual 3D environment, wherein the client computer transmits the data related to user interaction to the 3D digital asset processing system.

2. The system of claim 1, further comprising:
   a 3D digital asset placement system, coupled to the asset repository, the 3D digital asset placement system configured to:
   receive a request to present the 3D digital asset, in a 3D development environment, the 3D development environment generating the virtual 3D environment;
   retrieve the 3D digital asset and associated asset data from the asset repository, the associated asset data further associated with an asset category and asset type; and
   transmit the 3D digital asset and associated asset data to the 3D development environment.

3. The system of claim 1, wherein the 3D digital asset is a generic representation of an object or shape.

4. The system of claim 3, wherein the generic representation can be replaced with a representation of a brand.

5. The system of claim 2, wherein the associated asset data further includes at least one of a minimum or maximum polygon count value of the 3D digital asset.

6. A non-transitory computer readable medium comprising instructions which when executed by at least one processing system comprising at least one hardware processing core, executes a method for determining and recording data related to user interaction in a virtual three dimensional (3D) environment, comprising:

receiving data related to user interaction with a 3D digital asset in the virtual 3D environment, wherein the data related to user interaction with the 3D digital asset is received from a client computer, the client computer:

displaying the 3D digital asset in the virtual 3D environment via a graphical user interface, determining whether the 3D digital asset is drawn on a culling mask of a camera in the virtual 3D environment, wherein the 3D digital asset comprises a collidable mesh, using ray casting, draw a line between the camera and the 3D digital asset, determining that the line collides with the collidable mesh of the 3D digital asset, using a screen bounding function of a 3D engine, determining a proportion of the 3D digital asset covering the graphical user interface when it is determined that the line collides with the collidable mesh, based on the proportion, obtaining a percentage of the graphical user interface that is covered by the 3D digital asset, and based on the percentage, generating the data related to user interaction with the 3D digital asset in the virtual 3D environment, wherein the client computer transmits the data related to user interaction to the at least one processing system; and generating metrics related to user interaction, including tapping, touching, moving, time spent, viewing, requesting detailed description related to the 3D digital asset in the virtual 3D environment.

7. The non-transitory computer readable medium of claim 6, further comprising:

receiving a request to present the 3D digital asset, in a 3D development environment, the 3D development environment generating the virtual 3D environment;

retrieving the 3D digital asset and associated asset data from an asset repository, the associated asset data further associated with an asset category and asset type; and transmitting the 3D digital asset and associated asset data to the 3D development environment.

8. The non-transitory computer readable medium of claim 6, wherein the 3D digital asset is a generic representation of an object or shape.

9. The non-transitory computer readable medium of claim 8, wherein the generic representation can be replaced with a representation of a brand.

10. The non-transitory computer readable medium of claim 7, wherein the associated asset data further includes at least one of a minimum or maximum polygon count value of the 3D digital asset.

11. A method for determining and recording data related to user interaction in a virtual three dimensional (3D) environment, comprising:

receiving, by a computing device, data related to user interaction with a 3D digital asset in the virtual 3D environment, wherein the data related to user interaction with the 3D digital asset is received from a client computer, the client computer:

displaying the 3D digital asset in the virtual 3D environment via a graphical user interface, determining whether the 3D digital asset is drawn on a culling mask of a camera in the virtual 3D environment, wherein the 3D digital asset comprises a collidable mesh, using ray casting, drawing a line between the camera and the 3D digital asset, determining that the line collides with the collidable mesh of the 3D digital asset, using a screen bounding function of a 3D engine, determining a proportion of the 3D digital asset covering the graphical user interface when it is determined that the line collides with the collidable mesh, based on the proportion, obtaining a percentage of the graphical user interface that is covered by the 3D digital asset, and based on the percentage, generating the data related to user interaction with the 3D digital asset in the virtual 3D environment, wherein the client computer transmits the data related to user interaction to the computing device; and generating, by the computing device, metrics related to user interaction, including tapping, touching, moving, time spent, viewing, requesting detailed description related to the 3D digital asset in the virtual 3D environment.

12. The method of claim 11, further comprising:

receiving a request to present the 3D digital asset, in a 3D development environment, the 3D development environment generating the virtual 3D environment;

retrieving the 3D digital asset and associated asset data from an asset repository, the associated asset data further associated with an asset category and asset type; and transmitting the 3D digital asset and associated asset data to the 3D development environment.

13. The method of claim 11, wherein the 3D digital asset is a generic representation of an object or shape.

14. The method of claim 12, wherein the 3D digital associated asset data further includes at least one of a minimum or maximum polygon count value of the 3D digital asset.

15. The method of claim 13, wherein the generic representation can be replaced with a representation of a brand.

* * * * *